(12) United States Patent
Tai et al.

(10) Patent No.: US 7,561,812 B2
(45) Date of Patent: Jul. 14, 2009

(54) OPTICAL RECEIVER WITH MATCHED PHOTODETECTOR CAPACITANCE

(75) Inventors: Wai Keat Tai, Singapore (SG); Kok Soon Yeo, Singapore (SG); Chee Keong Teo, Singapore (SG); John Julius Asuncion, Singapore (SG); Lian Chun Xu, Singapore (SG)

(73) Assignee: Lite-On Technology Corp., Neihu, Taipei (TW)

( * ) Notice: Subject to any disclaimer, the term of this patent is extended or adjusted under 35 U.S.C. 154(b) by 623 days.

(21) Appl. No.: 11/250,329

(22) Filed: Oct. 13, 2005

(65) Prior Publication Data

US 2007/0086790 A1 Apr. 19, 2007

(51) Int. Cl.
*H04B 10/06* (2006.01)

(52) U.S. Cl. .................. 398/202; 398/208; 398/212; 398/213

(58) Field of Classification Search .......... 398/202–214
See application file for complete search history.

(56) References Cited

U.S. PATENT DOCUMENTS

| | | | | |
|---|---|---|---|---|
| 5,343,160 A | | 8/1994 | Taylor | |
| 5,793,230 A | * | 8/1998 | Chu et al. | 327/77 |
| 6,166,850 A | * | 12/2000 | Roberts et al. | 359/341.2 |
| 6,433,638 B1 | | 8/2002 | Heineke et al. | |
| 6,707,023 B2 | | 3/2004 | Fong et al. | |
| 2003/0156211 A1 | * | 8/2003 | Mizuno et al. | 348/294 |
| 2004/0067060 A1 | * | 4/2004 | Aronson et al. | 398/135 |
| 2004/0113669 A1 | * | 6/2004 | Wodnicki | 327/170 |
| 2004/0130397 A1 | * | 7/2004 | Mactaggart | 330/308 |
| 2005/0259167 A1 | * | 11/2005 | Inoue et al. | 348/300 |
| 2006/0220724 A1 | * | 10/2006 | Teng Hsu | 327/308 |

* cited by examiner

*Primary Examiner*—Ken N Vanderpuye
*Assistant Examiner*—Li Liu
(74) *Attorney, Agent, or Firm*—Winston Hsu

(57) ABSTRACT

An optical receiver has a voltage supply, a first node, and a second node. A first input of a differential amplifier is coupled to the first node and a second input of the differential amplifier is coupled to the second node. A photodetector is coupled between the voltage supply and the first node, which produces a photodetector capacitance. A programmable variable capacitor having a capacitance selectively matched to the photodetector capacitance is coupled between the voltage supply and the second node.

11 Claims, 2 Drawing Sheets

OPTICAL RECEIVER WITH MATCHED PHOTODETECTOR CAPACITANCE

CROSS-REFERENCE TO RELATED APPLICATIONS

Not applicable.

STATEMENT REGARDING FEDERALLY SPONSORED RESEARCH OR DEVELOPMENT

Not applicable.

REFERENCE TO MICROFICHE APPENDIX

Not applicable.

BACKGROUND OF THE INVENTION

Optical transmission systems are used in a variety of applications. Some applications transmit data in an optical signal carried on an optical fiber. Other applications transmit an optical signal through free space to an optical receiver. Examples of such systems are defined in the Infrared Data Association ("IrDA") communications standard. The IrDA communications standard is used when designing infrared ("IR") data ports on electronic devices, such as computers, personal digital assistants, and mobile telephones.

IR data transmissions between devices using the IrDA communications standard transmit information at communication speeds typically between about 100 kbps and 16 Mbps. The IrDA specification supports optical communications links between two nodes (electronic devices) from about 0 meters to about 1 meter apart, and it is desirable for IR receivers to detect low light pulse levels in order to accurately receive data from IR transmitters that are either far away or are weakly emitting IR light.

An IR receiver typically has a photodetector, such as a "PIN" diode, converting optical energy from the IR pulse into an electrical current, which is converted into a voltage data signal. The voltage data signal is amplified by one or more gain stages that generally have sufficient gain to detect low-level signals.

FIG. 1 is a prior art block diagram of a receiver circuit 100. A PIN diode 102 is modeled as a current source 105 in parallel with a capacitor 107 and a shunt resistor 106 because PIN diodes used as photodetectors are reverse biased, forming a depletion junction across the diode which is capacitive. Normally, the shunt resistor 106 is very large and can be normally ignored. When light, represented by an arrow 104, shines on the PIN diode 102, it produces a current, which is modeled by a constant current source 105 in parallel with a resistor 109, that flows through a load resistor 106, producing a voltage at node 108. The voltage at node 108 is provided to one input of a differential amplifier 110. The receiver circuit 100 includes additional amplifiers 112, 114, and a comparator 116, which compares the single-ended output 118 of amplifier 114 to a threshold (reference) voltage $V_{TH}$. The amplifier 114 is used to convert the differential signal into single-ended signal at the node 118. The comparator 116 provides an output 120 when the single-ended output exceeds $V_{TH}$, which is provided to logic 122 of the receiver 100.

Both the PIN diode 102 and a "dummy" capacitor 124 are biased by a voltage supply 126. The dummy capacitor 124 has a capacitance similar to the reverse-biased capacitance of the PIN diode 102. If noise is present on the voltage supply, for example, the dummy capacitor produces a current through a dummy load resistor 128 (which typically has the same resistance as load resistor 106) similar to the noise current produced by the photodetector 102 and load resistor 106. Noise from the voltage supply 126 is expressed as a common mode voltage at both inputs 130, 132 of the differential amplifier 110, and is rejected due to good common mode rejection ratio of the differential amplifier 110. Thus, the rejected common input signal does not trigger a false data event.

Unfortunately, process variations in the fabrication of PIN diodes, variations in circuit components in the voltage supply and bias circuitry, biasing point of the PIN diode, variations in the dummy capacitor, and other factors can result in an assembled receiver circuit 100 with a poor common mode rejection ratio ("CMRR"). Therefore, optical receiver circuits with improved CMRR are desirable.

BRIEF SUMMARY OF THE INVENTION

An optical receiver has a voltage supply, a first node, and a second node. A first input of a differential amplifier is coupled to the first node and a second input of the differential amplifier is coupled to the second node. A photodetector is coupled between the voltage supply and the first node, which produces a photodetector capacitance. A programmable variable capacitor having a capacitance selectively matched to the photodetector capacitance is coupled between the voltage supply and the second node.

DETAILED DESCRIPTION OF THE EMBODIMENTS

Figure 2A:
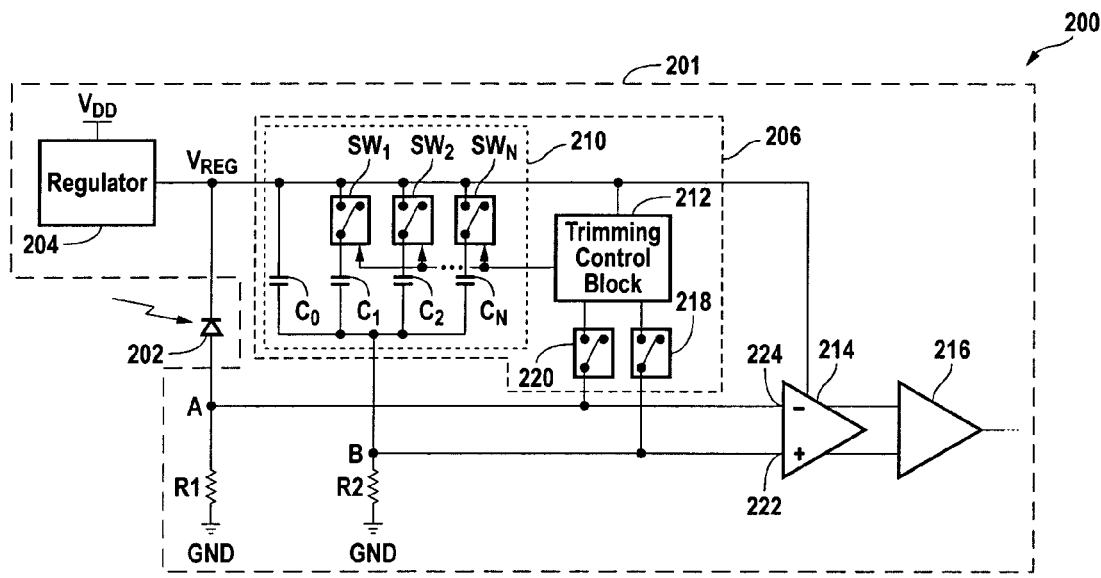
FIG. 2A is a circuit diagram of a portion of an optical receiver circuit according to an embodiment of the invention.

FIG. 2A is a circuit diagram of a portion of an optical receiver circuit 200 according to an embodiment of the invention. An external photodetector 202 (i.e. a photodetector that is external to an IC 201 having much of the optical receiver incorporated into it) is biased by a voltage source $V_{DD}$. An optional voltage regulator 204 allows the optical receiver circuit 200 to be used in a variety of applications having various supply voltages, as long as the local voltage supply is greater than the regulated voltage $V_{REG}$. Providing a voltage regulator also acts as a power supply filter (which improves the power supply rejection ratio) and, in a particular embodiment, prevents the variation of reverse biasing voltage of a PIN diode photodetector if the power supply voltage, $V_{DD}$ changes from 2.4 V to 3.6 V, for example, which in turn changes the junction capacitance of the PIN diode. A change in the junction capacitance of the PIN diode that results in a greater mismatch between the capacitance of the PIN diode and the dummy capacitor degrades CMRR.

A load resistor R1 senses the photo current through it (i.e. the current through the photodetector) and produces a voltage at node A. A trimming circuit 206 includes a trimming control block 212 that selectively sets the value of a programmable variable capacitor 210. The programmable variable capacitor 210 is selected so as to provide, when programmed or trimmed, the same common mode impedance at the non-inverting input 222 of the amplifier 214 as the inverting input 224 of the amplifier 214. Any common mode noise for example from the power supply that could generate dark bits is rejected by having the same common mode impedance at both inputs of the amplifier 214 and the nature of the differential amplifier configuration. As used herein, the term "programmable variable capacitor" refers to elements both before programming and after programming ("trimming"), including when the capacitance of a programmable variable capacitor has been fixed (set) after the trimming process.

The photodetector capacitance (e.g. the junction capacitance of a reverse-biased PIN diode photodetector) depends on several factors, such as diode size, doping level, and reverse bias voltage. Photodetector capacitance is generally on the order of a few pico-Farads ("pFs") to tens of pFs. Optical receivers are often embodied as an integrated circuit in conjunction with a variety of photodetectors and preferably can be used in a variety of applications, such as IR data links (IR transceivers) and photo-sensor devices. In an alternative embodiment, an optical receiver IC includes an integrated photodetector. Providing a programmable variable capacitor in such an instance is desirable in light of the possible variations that can arise in the value of fixed integrated capacitors and integrated photodetector capacitance.

Figure 1:
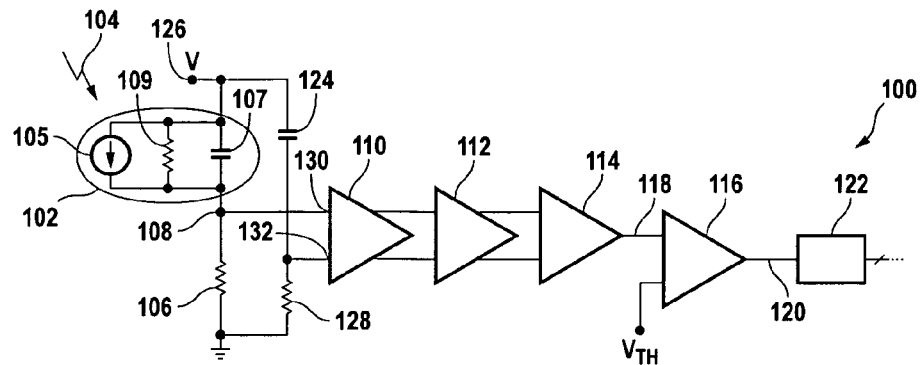
FIG. 1 is a circuit diagram of a prior art receiver circuit.

If a fixed dummy capacitor (see FIG. 1, ref. num. 124) is used in an optical receiver or optical transceiver IC, the user is constrained to using a photodetector with an appropriately matched junction capacitance at the desired operating point. Otherwise, dark bit errors may occur because of the poor common-mode rejection at the input to the amplification stage, which in many optical receivers is dominated by power supply rejection ratio ("PSRR"). The input to the first amplifier stage is most important because any differences will be further amplified by the following gain stages (see FIG. 1, ref. nums. 112, 114). Common-mode problems (such as degraded power supply rejection ratio) can arise if the type of photodetector or operating point in the optical receiver circuit changes. For example, the photodetector that the optical receiver IC was originally designed to operate with may become unavailable, or the user desires to use a less expensive photodetector. Similarly, photodetector capacitance varies from part to part and from lot to lot, which can result in degraded PSRR when a fixed dummy capacitor is used.

Similar problems arise from changes in the supply voltage, such as when the optical receiver IC is used in a variety of optical receivers. In such cases, the user is often faced with re-designing the IC to have a new dummy capacitance that more closely matches this new photodetector capacitance. Unfortunately, dummy capacitors in optical receiver ICs might have as much as ±20% variation in capacitance due to variations in the IC manufacturing process.

The trimming circuit 206 provides many advantages. The trimming circuit 206 allows several different types of photodetectors to be used with the optical receiver IC 201 and allows for more precisely compensating variations in photodetector capacitance (both intra-batch and batch-to-batch) using a given photodetector part, allows an optical receiver to be operated at various bias points in different applications, and can also account for variations in the IC manufacturing process, such as input characteristics of the differential amplifier, variations in capacitors of the IC, and variations in the resistance of the load resistors R1, R2. The mismatch between the load resistors R1 and R2 is much less (about 2%) as compared with the rest because in the layout, the resistors R1 and R2 are well matched using layout techniques. However, it is still possible to trim the resistor R1 and R2.

The trimming circuit 206 includes a trimming control block 212 that sets the capacitance of the programmable variable capacitor 210. Generally, the trimming control block adjusts the capacitance of the programmable variable capacitor 210 until the voltage at node B equals the voltage at node A during the trimming process, which improves the rejection of common-mode signals at the differential amplifier 214. The trimming control block 212 is then disabled and disconnected from the inputs of the amplifier 214 through switches 218 and 220 and the capacitance of programmable variable capacitor 210 is fixed.

In a particular embodiment, the programmable variable capacitor includes a capacitor array made-up of several capacitors $C_0, C_1, C_2, \ldots, C_N$ in parallel between $V_{REG}$ and dummy load resistor $R_2$. Some of the capacitors $C_1, C_2, C_N$ are in series with switches $SW_1, SW_2, SW_N$ that are controlled (i.e. switched) by the trimming control block 212. During trimming, switches 218, 220 are closed so that the trimming control block 212 is connected to the inputs 222, 224 of the fully differential amplifier 214. This allows the trimming control block 212 to monitor the voltages at nodes A and B. The trimming control block is programmed (or is controlled using external logic) to switch capacitors in the programmable variable capacitor 210 in and out to vary the total capacitance of the programmable variable capacitor 210 until optimum tracking of the photodetector capacitance is achieved.

In a particular embodiment, the capacitance of the initial capacitor $C_0$ is close to, but less than, the least capacitance expected (e.g. a few pico-Farads). This capacitor $C_0$ may be unswitched, so that its value is always included in the total capacitance. The next capacitor $C_1$ is the half the greatest expected value (e.g. tens of pico-Farads) minus $C_0$. The next capacitor $C_2$ is ½ $C_1$, etc., depending on the range of capacitance or number of resolution bits desired. In a particular embodiment, $C_N = C_0/2^N$ where N=0, 1, 2, 3, for example:

$C_1 = C_0/2; C_2 = C_0/2^2;$ etc.

The switches and corresponding capacitors provide a selectively switch-able parallel capacitor array. In a particular embodiment, switching all of the parallel capacitors into the circuit, in combination with any unswitched capacitor(s), will set the programmable variable capacitor 210 to the maximum expected photodetector capacitance. Several other capacitor arrays are possible, for example, the fixed capacitor is an arbitrary intermediate value, or all capacitors are switch-able. It is understood that "maximum expected photodetector capacitance" may include other circuit variations, and that other topologies are possible, such as locating a fixed dummy capacitor outside of the programmable variable capacitor. Alternatively, a varactor is used as the programmable variable capacitor instead of a step-wise variable, switched capacitor. The capacitance of a varactor changes with the applied control voltage. The control voltage is trimmed to match the capacitance of the varactor to the capacitance of the PIN diode.

Once the optimum trimmed capacitance ("$C_{TRIM}$") is determined, the programmable variable capacitor 210 is set to $C_{TRIM}$, the trimming control block is turned off, and the trimming control block is disconnected from the inputs 222, 224 of the fully differential amplifier 214 by opening switches 218, 220. In a particular embodiment, the maximum mismatch error between the PIN diode capacitance and the optimum trimmed capacitance $C_{TRIM}$ is $C_0/2^N$.

Alternatively, the switches 218, 220 are omitted, and the control block is merely turned off. In a particular embodiment, the trimming control block includes one-time-programmable ("OTP") logic, such as fuses or anti-fuses. Alternatively, a programmable variable capacitor includes OTP logic. $C_{TRIM}$ is "burned" into the trimming control block or programmable variable capacitor so that the programmable variable capacitor provides a capacitance of $C_{TRIM}$ each time the optical receiver circuit 200 is powered-up. Alternatively, non-volatile electronic memory or other logic is used to control the trim capacitance; however, once a photodetector has been assembled into an optical receiver and $V_{REG}$ has been established, OTP logic provides a stable, reliable trim capacitance.

Figure 2B:
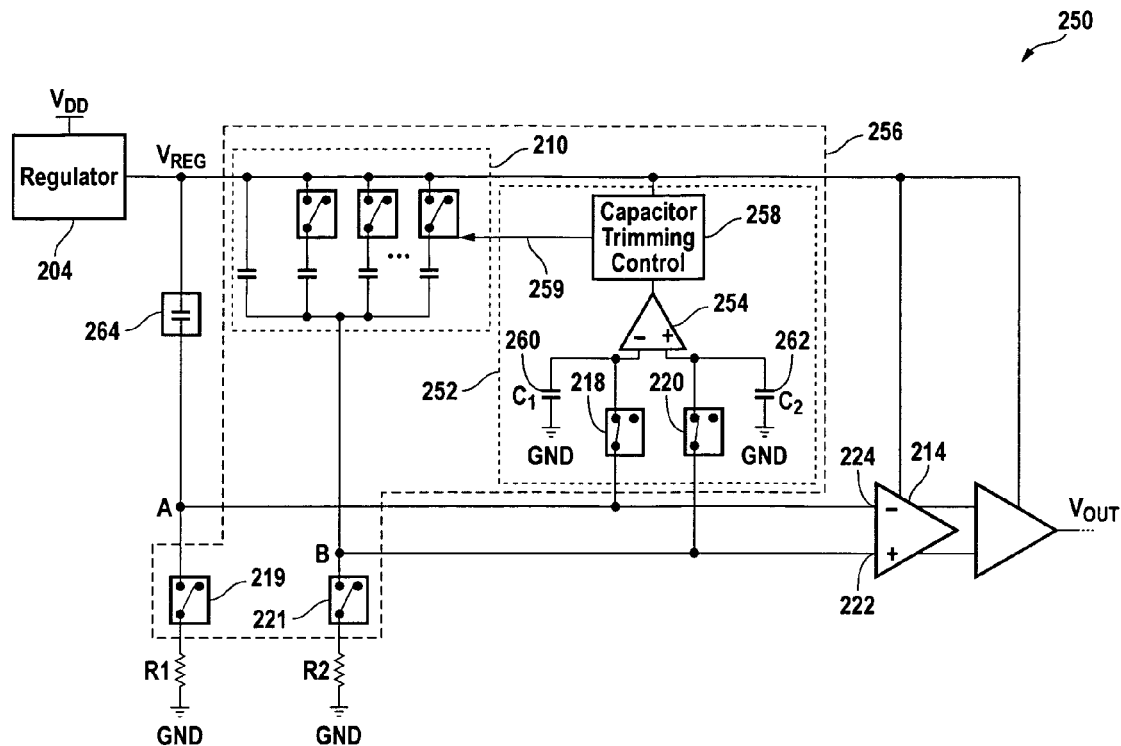
FIG. 2B is a circuit diagram of portion of an optical receiver with a trimming circuit according to an embodiment of the invention.

The optical receiver circuit 200 includes a differential-to-single-ended amplifier stage 216. Those of skill in the art of differential and single-ended amplification understand that several different types of topologies may be used, and in alternative diagrams, several stages may be combined in a single symbol. For example, an entire amplification chain having several fully differential amplifiers and one or more single-ended amplifiers might be represented with a single symbol. Thus, the illustrated amplification stages are merely exemplary FIG. 2B is a circuit diagram of portion of an optical receiver circuit 250 with a trimming circuit 256 according to an embodiment of the invention. The trimming circuit 256 has a programmable variable capacitor 210, as described above in reference to FIG. 2A, and a trimming control block 252. The trimming control block 252 includes a comparator 254 whose inputs are selectively coupled to nodes A and B through switches 218, 220; and a capacitor trimming control circuit 258 that provides a trimming signal 259 to the programmable variable capacitor 210. The inputs of the comparator 254 are also coupled to ground through capacitors 260, 262. Trimming is done when the photodetector is not illuminated, and the photodetector is represented by the photodetector capacitance 264 in this circuit diagram (compare FIG. 1, ref. nums. 105, 106, 107).

During trimming, the switches 218, 220 are closed to connect the comparator 254 to nodes A and B, and switches 219, 221 are opened to disconnect the load resistor R1 and the dummy load resistor R2, and hence nodes A and B, from ground. $C_1$ can be closely matched to $C_2$ in an IC by fabricating them close to each other. Similarly, the mismatch error arising from differences between R1 and R2 can be small compared with the mismatch error arising from the difference between $C_{PIN}$ and the capacitance of the dummy capacitor 124 in FIG. 1, particularly if R1 and R2 are incorporated in the optical receiver IC (see FIG. 2A, ref. num. 201). Alternatively, R1 and R2 are not switched out during a trimming process, which is particularly desirable if they are not closely matched, such as if they are discrete circuits external to an optical receiver IC. In other words, switches 219, 221 are omitted or are closed during the trimming process so that the difference between R1 and R2 is account for when establishing $C_{TRIM}$.

The comparator 254 compares the voltage at node A ($V_A$) with the voltage at node B ($V_B$) and provides a signal to the trimming control block 252 that indicates whether $V_A$ is greater than, equal to, or less than $V_B$. For example, if $V_B$ is greater than $V_A$, the signal from the comparator 254 is a positive voltage; a negative voltage if the $V_A$ is greater than $V_B$, and zero if $V_A$ equals $V_B$. The polarities of the inputs of the comparator and differential amplifier are merely exemplary. The magnitude of the signal indicates the difference in voltage levels, and logic in the capacitor trimming control circuit 258 varies the capacitance of the programmable variable capacitor 210 until the smallest difference between $V_A$ and $V_B$ is achieved.

With no photo signal present and switches 219 and 221 open, the voltage at node A is:

$$V_A = C_{PIN}/(C_1+C_{PIN}) * V_{REG}$$

where $C_{PIN}$ is the photodetector capacitance 264, and the voltage at node B is $$V_B = C_{PROG}/(C_2+C_{PROG}) * V_{REG}$$

where $C_{PROG}$ is the capacitance of the programmable variable capacitor 210, which is programmed by the capacitor trimming control circuit during the trimming operation. The goal of the trimming process is to find the optimal $C_{PROG}$ (i.e. $C_{TRIM}$).

To insure that $V_A$ is close to the operational reverse voltage of the photodetector during normal operation, the capacitors $C_1$ and $C_2$ are selected to be at least ten times lower than the value of the photodetector capacitance 264. Therefore $V_A$ will be close to $V_{REG}$. The trade-off of this selection of capacitance values for $C_1$ and $C_2$ is that the comparator 254 should have low input offset voltage and a well-matched input stage. The selection of C1 and C2 will eventually setup up a voltage $V_A$ and $V_B$ and we would like voltage developed to be as close as the operating dc condition (that is close to the ground). The smallest step change in voltage at the node B is introduced by the $C_N$ capacitor in the programmable variable capacitor 210. As $C_N = C_0/2^N$, the smallest voltage change in node B is $V_B = C_N/(C_2+C_{PROG}) * V_{REG}$. The larger the C2 value, smaller the $V_B$ voltage. Hence, the trade off is we need a low input offset voltage and a well-matched input stage of the comparator if we intended to use smaller C1 and C2 values.

It is likely that the signal from the comparator will not equal zero because the capacitance of the programmable variable capacitor is not infinitely variable, but rather is step-wise adjustable, thus the final value, $C_{TRIM}$, might not exactly match $C_{PIN}$. In a particular embodiment, the capacitor trimming control circuit 258 dithers the trimming signal 259 to find the minimum signal from the comparator 254. Such techniques are well-known in the art of digital control, and there are several alternative algorithms and techniques; hence, a more detailed description of the logic function of the capacitor trimming control circuit 258 is omitted.

After the optimum capacitance of the programmable variable capacitor 210 has been determined (i.e. after matching $C_{PROG}$ to $C_{PIN}$), the capacitance of the programmable variable capacitor 210 is fixed (set) to $C_{TRIM}$, such as by programming OTP logic in the capacitor trimming control circuit 258 or programming fuses in the programmable variable capacitor 210. The switches 218, 220 are opened to disconnect the comparator 254 from nodes A and B, and switches 219, 221 are closed to connect nodes A and B to ground through resistors R1 and R2. After trimming is complete, the programmable variable capacitor 210 has a fixed value of $C_{TRIM}$ that provides a well-matched dummy capacitance to the photodetector capacitance 264.

In a particular embodiment, the switches 218, 220 are well-matched to each other, the switches 219, 221 are well-matched to each other, and the capacitors 260, 262 are also well-matched to each other. This is accomplished by design and by physical proximity on the IC, so that both devices in each pair experience similar processing. Switches 218, 220 typically operate reciprocally with switches 219, 221. In other words, one set of switches is open when the other is closed, and vice versa. In normal operation of the optical receiver, switches 219 and 221 are closed. In a particular embodiment, switches 218, 220 are fused or programmed open after trimming, and switches 219, 221 are anti-fused or programmed closed. Thus, after trimming, when the optical receiver circuit 250 is powered up, the capacitance of the programmable variable capacitor 210 will be set to the optimum capacitance determined and programmed in the trimming sequence. In other words, the programmable variable capacitor will provide a dummy capacitance that is closely matched to the capacitance of the photodetector. This allows great flexibility in choosing the type of photodetector used when the photodetector is extrinsic to the optical receiver IC, as well as flexibility in biasing the photodetector. Similarly, variations in the photodetector capacitance and bias point in an integrated photodetector can be compensated for using a programmable variable capacitor.

Figure 3:
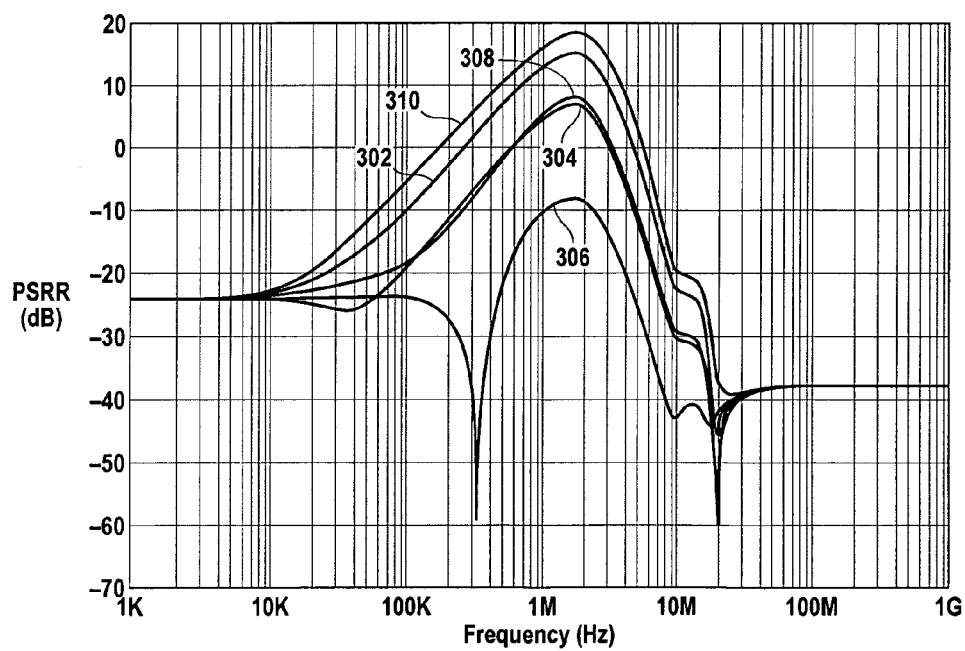
FIG. 3 shows plots of simulated power supply rejection ratios for various trimmed capacitor values.

FIG. 3 shows plots of simulated PSSRs for various trimmed capacitor values ($C_{TRIM}$). In the simulation model, the photodetector capacitance was five pFs, and a voltage supply variation of 1 $V_{AC}$ on top of a 3 VDC supply value was used. A first plot 302 shows the PSRR for $C_{TRIM}$=2 pFs, a second plot 304 shows the PSRR for $C_{TRIM}$=4 pFs, a third plot 306 shows the PSRR for $C_{TRIM}$=5 pFs, a fourth plot 308 shows the PSRR for $C_{TRIM}$=6 pFs, and a fifth plot 310 shows the PSRR for $C_{TRIM}$=10 pFs. These plots show that PSRR is improved if the capacitance of the programmable variable capacitor is trimmed to match the photodetector capacitance.

Figure 4:
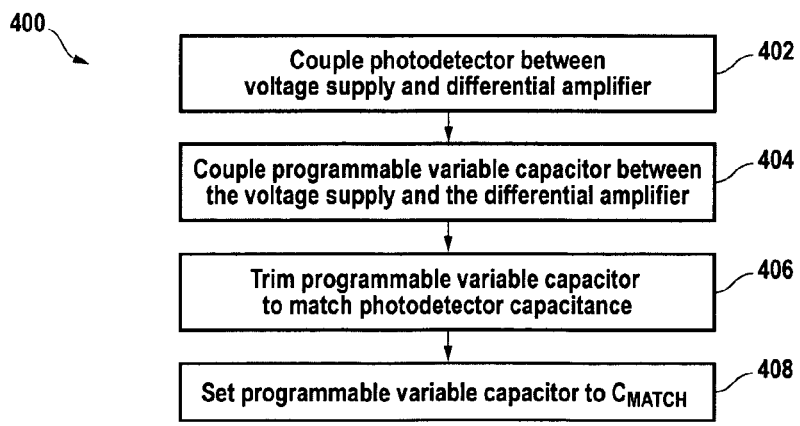
FIG. 4 is a flow chart of a method of programming a trim capacitor in an optical receiver according to an embodiment of the invention.

FIG. 4 is a flow chart of a method 400 of programming a trim capacitor in an optical receiver according to an embodiment of the invention. A photodetector is coupled between a voltage supply and a first input of a differential amplifier to produce a photodetector capacitance (step 402). A programmable variable capacitor is coupled between the voltage supply and a second input of the differential amplifier (step 404). The capacitance of the programmable variable capacitor is trimmed to match the photodetector capacitance (step 406). "Match" means that the capacitance of the programmable variable capacitor is adjusted to be reasonably close to the photodetector capacitance so as to improve PSRR. The resulting capacitance of the programmable variable capacitor is referred to as "$C_{TRIM}$". The capacitance of the programmable variable capacitor is set to $C_{TRIM}$ (step 408). In a particular embodiment, the programmable variable capacitor includes a plurality of switches selectively coupling a plurality of capacitors in parallel. After trimming, when the optical receiver is powered up, $C_{TRIM}$ of the programmable variable capacitor provides a dummy capacitance that improves PSRR of the optical receiver.

While embodiments of the present invention have been illustrated in detail, it should be apparent that modifications and alternatives to these embodiments might occur to one skilled in the art without departing from the scope of the present invention as set forth in the following claims.

What is claimed is:

1. An optical receiver comprising:
   a voltage supply;
   a first node;
   a second node;
   a differential amplifier having a first input coupled to the first node and a second input coupled to the second node;
   a photodetector coupled between the voltage supply and the first node, the photodetector having a photodetector capacitance; and
   a programmable variable capacitor coupled between the voltage supply and the second node having a capacitance selectively matched to the photodetector capacitance;
   wherein the differential amplifier and the programmable variable capacitor are incorporated in an integrated circuit, the photodetector is extrinsic to the integrated circuit, and the integrated circuit further includes:
   a trimming control block, wherein the trimming control block includes:
      a comparator switchably coupled to the first node and to the second node and
      a first capacitor between the comparator and ground switchably coupled to the first node and a second capacitor between the comparator and ground switchably coupled to the second node.

2. The optical receiver of claim 1 wherein the photodetector is a PIN diode.

3. The optical receiver of claim 1 wherein the integrated circuit further includes a voltage regulator.

4. The optical receiver of claim 1 wherein the trimming control block is switchably coupled to the first node and second node.

5. The optical receiver of claim 1 wherein at least one of the trimming control block and the programmable variable capacitor includes one-time-programmable elements selectively programmed to match the capacitance of the programmable variable capacitor to the photodetector capacitance.

6. The optical receiver of claim 1 wherein the programmable variable capacitor includes a plurality of switches, each of the plurality of switches in series with each of a corresponding plurality of capacitors so as to provide a selectively switchable parallel capacitor array.

7. The optical receiver of claim 6 wherein the programmable variable capacitor further includes a capacitor in parallel with the selectively switchable parallel capacitor array.

8. The optical receiver of claim 1 wherein the first capacitor has a first capacitance not greater than about one-tenth of photodetector capacitance.

9. The optical receiver of claim 1 further comprising:
   a first load resistor coupled between the first node and ground; and
   a second load resistor coupled between the second node and ground.

10. The optical receiver of claim 8 wherein the differential amplifier and the programmable variable capacitor are incorporated in an integrated circuit, and further comprising
    a trimming control block;
    a first switch disposed between the first load resistor and the first node; and
    a second switch disposed between the second load resistor and the second node, wherein the trimming control block, the first switch, and the second switch are incorporated in the integrated circuit.

11. The optical receiver of claim 1 wherein the voltage supply is a regulated voltage supply.

* * * * *